May 12, 1970 — R. BELL — 3,511,469
SOLENOID OPERATED VALVE
Filed May 6, 1966
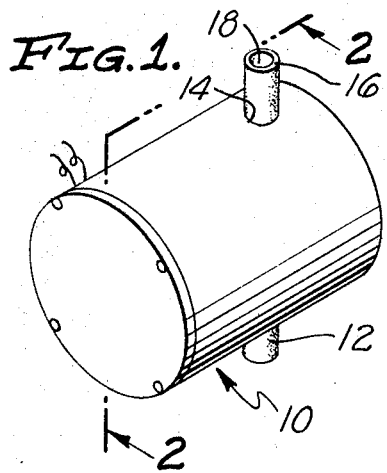
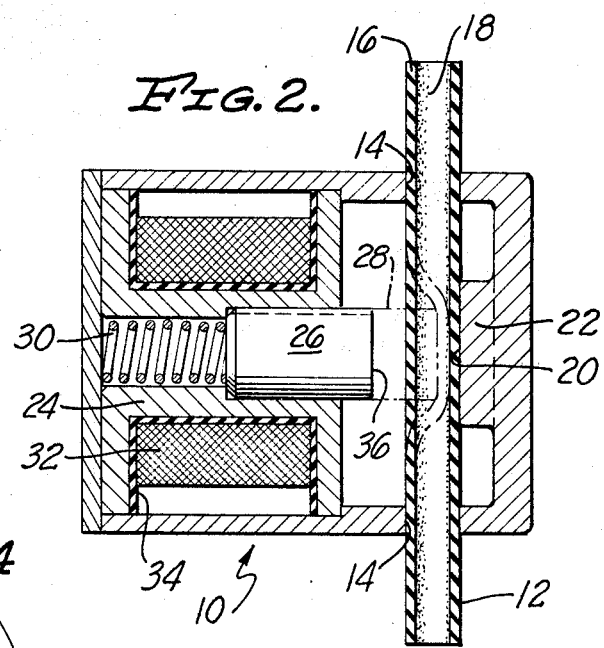
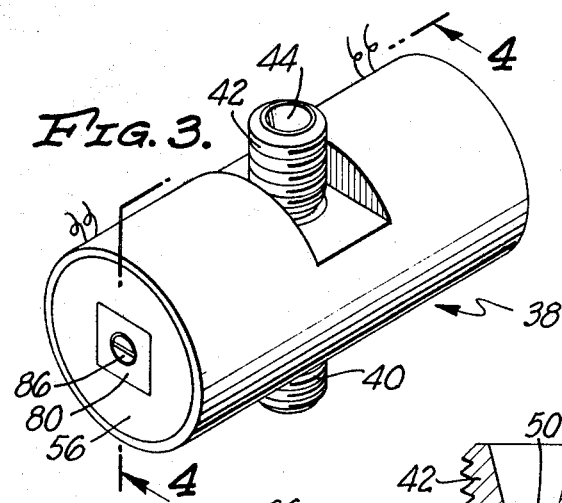
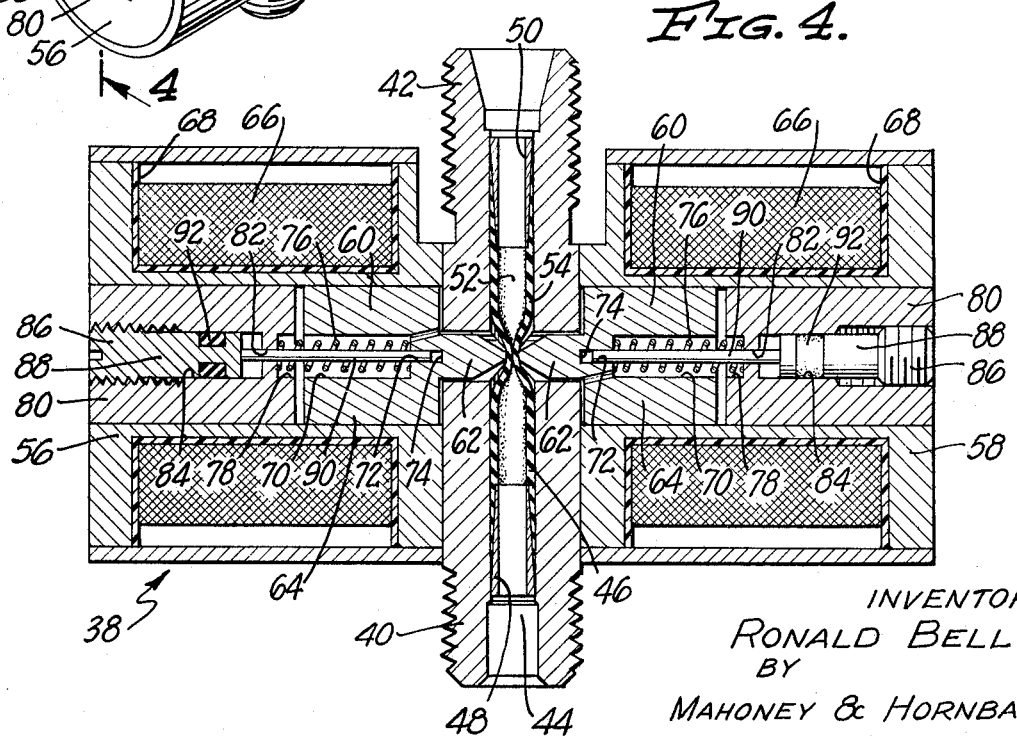
INVENTOR
RONALD BELL
BY
MAHONEY & HORNBAKER
ATTORNEYS

United States Patent Office 3,511,469
Patented May 12, 1970

---

3,511,469
SOLENOID OPERATED VALVE
Ronald Bell, Northridge, Calif., assignor to Eckel Valve Co., San Fernando, Calif., a corporation of California
Filed May 6, 1966, Ser. No. 548,190
Int. Cl. F16k 7/06
U.S. Cl. 251—7                          2 Claims

ABSTRACT OF THE DISCLOSURE

A normally closed solenoid operated valve in which the fluid passage comprises in part at least a collapsible tube and in which a solenoid retracted plunger means is normally spring biased to pinch the two tube walls together with resultant closure of the passage to fluid flow.

---

This invention relates to a solenoid operated valve and, more particularly, to a solenoid operated valve having at least one solenoid plunger positioned for radially collapsing a flexible tube whereby the collapse of the flexible tube will close the tube passage, and the release of the flexible tube will permit the tube to flex outwardly and at least partially open the tube passage.

Furthermore, in one form of the present invention, the flexible tube is collapsed by the solenoid plunger against a stationary anvil, whereas in another form of the invention, the flexible tube is collapsed between diametrically opposed solenoid plungers which may be mounted for selective adjustment of the plunger strokes so that the tube passage is permitted only to partially open when the solenoid plungers are moved in the directions away from the tube.

Many prior forms of valves have been provided, most of which have included passages arranged for selective mechanical blocking of the passage in order to control the flow of fluids through the valves. The most obvious difficulty with these prior constructions is maintaining the necessary mechanical movement, while still maintaining the passage through the valve sealed so as to prevent the escape of the fluids therethrough.

In view of such difficulties, it has been found feasible in certain instances to provide valves with flexible tubes extending therethrough so that the tube forms the fluid carrier, and merely by providing a means for collapsing the wall of the flexible tube, it is possible to selectively close off or restrict the tube and thereby form a valve. This flexible tube type of valve clearly eliminates the foregoing sealing problems, but to my knowledge, prior to my present invention, there has never been a flexible tube type of valve of a practical construction which is automatically operable and can be incorporated in an automatic system, as opposed to manually operable and impossible of incorporation in an automatic system.

It is, therefore, an object of my invention to provide a solenoid operated valve of the aforementioned character which is of practical form, relatively simple in operation and readily adaptable to automatic control systems. The valve construction of the present invention is constructed to positively stop the flow of fluids therethrough in closed position by collapsing the wall of a flexible tube carrying the fluid so as to close the tube passage, and this is accomplished by use of a solenoid plunger, usually constructed to retain the valve closed in the normal position and open the valve in the actuated position. In view of the fact that the valve is simply operated by actuation of a solenoid, it is easily adaptable to solenoid operation by fluids or electricity in the usual automatic control system.

It is another object of my invention to provide a solenoid operated valve having a solenoid plunger positioned for movement toward and away from a flexible tube wherein the plunger will engage the tube wall and collapse the tube so as to close off the tube passage, and upon release of the tube wall by the plunger, the tube will flex outwardly to open the tube passage to a predetermined extent. The tube may be formed of the usual flexible or resilient materials, such as rubber or plastic, the prime requirement being that the tube will be flexible so as to be collapsed by the solenoid plunger, and will return to a partially or completely open condition when the solenoid plunger is withdrawn. Also, the flexible material forming the tube must be capable of transmitting the particular fluids to be transmitted through the valve without adverse affects thereon. Consequently, the choice of tubular materials is predicated upon the fluid flowing through the tube.

It is a further object of my invention to provide a solenoid operated valve of the foregoing flexible tube type in which, in one form, the collapse of the flexible tube is accomplished by a single solenoid plunger movable toward a stationary anvil, whereas in another form, collapse of the tube is achieved by diametrically opposed solenoid plungers acting in unison. The valve, therefore, may be of a simple construction which provides obvious economic advantages, or may be provided in a more sophisticated form which, although still relatively economical to produce, will provide fluid control advantages not possible with the simpler form. The particular form of valve used in any fluid control system will, of course, be dependent on the demands and requirements of the valve in use.

It is still another object of my invention to provide a solenoid operated valve of the foregoing flexible tube type wherein the movement of the solenoid plunger may be subject to selective adjustment so that when a flexible tube is permitted to flex for opening the tube passage therethrough, any degree of restriction up to complete opening can be provided where such restriction is desired. This is accomplished by providing a selective adjustment of the extent of withdrawal of the solenoid plunger or plungers in the tube passage opening position. In this manner, a valve may be provided having a predetermined restriction therein, even when in the open position, as an aid to the regulation of a particular fluid transmitting system.

Other objects and advantages of the invention will be apparent from the following specification and the accompanying drawing which is for the purpose of illustration only, and in which:

FIG. 1 is a perspective view showing one form of a solenoid operated valve constructed according to certain of the principles of the present invention;

FIG. 2 is an enlarged, vertical, sectional view, part in elevation, taken along the broken line 2—2 in FIG. 1;

FIG. 3 is a perspective view showing another form of a solenoid operated valve constructed according to certain of the principles of the present invention; and FIG. 4 is an enlarged, vertical, sectional view, part in elevation, taken along the broken line 4—4 in FIG. 3.

Referring to FIGS. 1 and 2 of the drawing, the solenoid operated valve shown therein includes a housing, generally indicated at 10, having a flexible tube 12 extending therethrough and projecting from the openings 14 formed at opposite sides of the housing. The flexible tube 12 may be formed of any appropriate resilient material such that the tube wall 16 may be collapsed radially to close off the tube passage 18 and when released will flex to original position so as to open the tube passage. The choice of materials for the flexible tube 12 may, of course, be dependent on the particular fluid, whether a gas or a liquid, which must be transmitted through the valve.

The flexible tube 12 is positioned in the housing 10 abutting the plane surface 20 of an anvil 22, which anvil is formed extending into the housing and diametrically opposed to an electrically operated solenoid 24 at the opposite side of the flexible tube wall 16.

The solenoid 24 includes a plunger 26 mounted in the housing 10 movable radially of the tube wall 16 in directions toward and away from this tube wall and the anvil 22. The plunger 26 is normally resiliently urged in the direction toward the tube wall 16 so as to force the tube wall to collapse and close off the tube passage 18, that is, into the position shown by the broken lines 28 in FIG. 2, by a compression spring 30. An annular electric solenoid coil 32 is positioned within the annular coil chamber 34 surrounding the plunger 26 and when this coil is electrically energized, the plunger will be pulled from its normal position closing off the tube passage 18 in the direction radially away from the tube wall 16 or the longitudinal axis of said tube so as to permit the tube wall to flex outwardly and open the tube passage. Although the plunger 26 is shown as having its inner extremity movable out of engagement with the tube wall 16, it may be so dimensioned as to remain engaged with said wall in said open and closed positions.

The face 36 of the inner extremity of the solenoid plunger 26 is also preferably a plane surface so as to co-operate with the anvil plane surface 20 in assuring complete collapse of the tube wall 16 and complete closing of the tube passage 18. Also, the solenoid coil 32 is provided with the usual source of electrical energy and the controls therefor may be incorporated in any automatic system, dependent upon the particular valve application. This too will determine the particular materials from which the various valve components are formed with the prime requirement in the particular embodiment shown being that usual with electrically operated solenoids and that is that the solenoid plunger 26 will be movable in a nonmagnetic material.

Another form of solenoid operated valve incorporating certain of the principles of the present invention is shown in FIGS. 3 and 4 and includes a housing generally indicated at 38 having externally threaded port fittings 40 and 42 brazed or otherwise secured therein, and forming a substantially continuous tube receiving bore 44 extending therethrough. A flexible tube 46 of any resilient material is interspaced between the adjacent inner extremities of the fittings 40 and 42 and is secured against axial movement relative to the fittings 40 and 42 by the hollow tapered wedge members 48 and 50. Thus, the flexible tube 46 forms a tube passage 52 opening completely through the housing 38 and the fittings 40 and 42 are mounted so as to expose at least diametrically opposed portions of the tube wall 54 within the housing 38.

Diametrically opposed solenoids 56 and 58 are incorporated in the housing 38, each having an armature plunger 60 movable in directions radially toward and away from the exposed portion of the tube wall 54. The solenoids 56 and 58 are substantially identical, being oriented so that the plungers 60 thereof are diametrically opposed and are formed with reduced, generally wedge-shaped inner end portions 62 which extend laterally a sufficient distance to completely outwardly overlie the tube wall 54 and to move against the tube wall to flex the tube wall inwardly and close off the tube passage 52, as shown.

The outer extremities 64 of the plungers 60 are slidably mounted in the housing 38 surrounded by the annular electric solenoid coils 66 positioned in the coil chambers 68. The plunger extremities 64 are preferably of square or rectangular cross section to maintain the end portions 62 in proper alignment at all times.

The plunger outer extremities 64 are formed with axially-oriented spring recesses 70 opening outwardly opposite from the plunger end portions 62 and opening inwardly into stop rod recesses 72, which stop rod recesses terminate inwardly at stop surfaces 74. Compression springs 76 are received in the spring recesses 70 and extend outwardly from the plunger outer extremities 64 into aligned spring recesses 78 of adjustment members 80 secured in the housing 38 and normally spaced from the plungers, as shown. Thus, the springs 76 tend constantly yieldingly to urge the plungers 60 away from the adjustment members 80 and into the positions wherein the plunger end portions 62 collapse the tube wall 54 and close off the tube passage 52.

The adjustment members 80 incorporate stop rod support openings 82 axially aligned with the stop rod recesses 72 of the plungers 60. The stop rod openings 82 of the adjustment members 80, in turn, communicate with adjustment recesses 84 which open from the adjustment members opposite from the spring recesses 78. Stop members 86 are received within the adjustment recesses 84 of the adjustment members 80 with stop member adjustment portions 88 threadably engaged with the adjustment members 80 and stop rod portions 90 of these stop members extending forwardly through the stop rod openings 82 of the adjustment members, internally of the springs 76, and ultimately into the stop rod recesses 72 of the plungers 60.

It will be noted that when the plungers 60 are at their inward positions collapsing the tube wall 54 and closing off the tube passage 52, as shown, the ends of the stop rod portions 90 of the stop members 86 are spaced from the stop surfaces 74 of the plungers 60, but the plungers may move outwardly simultaneously by virtue of the electric solenoid coils 66 being electrically energized only until the stop members 86 engage the plunger stop surfaces 74 so that these stop members limit the outward movement of the plungers. The plungers 60 are made to move outwardly simultaneously by an application of electrical current simultaneous to solenoids 56 and 58.

Further, the stop members 86 may be threadably adjusted relative to the adjustment members 80 and therefore relative to the plungers 60 so as to selectively adjust the outward limit of movement of the plungers. As shown, the adjustment portions 88 of the stop members 86 are sealed against the adjustment members 80 by the seals 92 for the purpose of preventing the ingress of ambient atmosphere into the valve construction.

Thus, according to the principles of the present invention, solenoid operated valves are provided in which a solenoid plunger acting against a stationary anvil, or oppositely disposed solenoid plungers acting against one another, are positioned for effectively collapsing a flexible tube wall for closing off the tube passage thereof, with these solenoid plungers being movable outwardly in a direction away from the flexible tube wall for permitting the tube wall to flex outwardly and at least partially, if not completely, open the tube passage for the flow of fluids therethrough.

Furthermore, in one form of the present invention, the outward movement of the solenoid plungers may be selectively adjusted for limiting the degree of outward flexing of the tube wall and, therefore, the degree of opening of the tube passage so that a restricted tube passage may be provided as desired. Also, with the constructions provided by the present invention, the valve construction may be easily and simply incorporated in an automatic system for automatic opening and closing of the valve constructions.

I claim:

1. In a solenoid operated valve the combination of: a housing; a flexible tube in said housing having a wall forming an axial passage; solenoid means mounted on said housing at radially opposite sides of said tube and having radially opposed plungers movable radially in directions toward and away from said tube wall, said plungers flexing said tube wall inwardly to close said tube passage when said plungers are moved in said directions toward said tube wall and permitting said tube passage when said plungers are moved in said directions away from said tube wall; and means for actuating said solenoid means for moving said plungers, said solenoid means including springs normally urging said plungers in said directions towards said tube wall, and including electric coil means for moving said plungers in said directions away from said tube wall when said solenoid means is energized, stop means axially aligned with said plungers and including pin members slidably received within recess means formed in said plungers for limiting the movement of said plungers in said directions away from said tube wall, and screw thread adjustable means connected to said stop means operable to adjust said stop means radially of said tube wall and relative to said plungers.

2. In a solenoid operated valve the combination of: a housing; means constituting a first fluid port at one side of said housing, other means constituting a second fluid port at the opposite side of said housing and disposed in substantial axial alignment with said first port, adjacent ends of said ports being spaced from each other; within said housing; a resilient tube in said housing extending across the space between said adjacent ends of said ports, the opposite ends of said tube being operatively connected to said first and second port means to form a fluid passage extending through said housing; means for permitting or preventing fluid flow through said passage comprising a pair of solenoid means mounted in said housing at opposite sides of said tube at a point thereon between the adjacent ends of said first and second ports and each of said solenoid means including a reciprocable armature means including a plunger having a distal end engageable with said tube in said space and spring means normally causing said plungers to engage and pinch said tube closed, said solenoid means further including electromagnetic means operable simultaneously to cause said armatures and plungers to retract in opposition to the bias of the spring means and to allow the tube to open for the passage of fluid; and a pair of manually adjustable stop means axially aligned with said plungers and carried one each by each of said solenoid means, each stop means including a pin member slidably received within a recess formed in the associated plunger, operable to determine the extent to which said armature and plunger means may be retracted in response to energization of said solenoid means.

References Cited

UNITED STATES PATENTS

| | | | |
|---|---|---|---|
| 2,355,232 | 8/1944 | Nelson et al. | 251—7 XR |
| 2,841,357 | 7/1958 | Little | 251—6 |
| 3,308,989 | 3/1967 | Allen et al. | 251—5 XR |
| 2,936,994 | 5/1960 | Lau | 251—7 XR |
| 3,389,355 | 6/1968 | Schroeder | 251—137 XR |

WILLIAM F. O'DEA, Primary Examiner

R. GERARD, Assistant Examiner

U.S. Cl. X.R.

251—137, 212, 285